United States Patent [19]

Ament et al.

[11] Patent Number: 4,705,273
[45] Date of Patent: Nov. 10, 1987

[54] CUSHIONED BAT

[75] Inventors: Harold E. Ament, Sandwich; Frederick G. Kirschner, Lagrange, both of Ill.

[73] Assignee: Ideas That Sell, Inc., Sheridan, Ill.

[21] Appl. No.: 779,583

[22] Filed: Sep. 24, 1985

[51] Int. Cl.$^4$ .............................................. A63B 59/06
[52] U.S. Cl. ............................. 273/72 R; 273/DIG. 8
[58] Field of Search ............. 273/72 R, 67 R, DIG. 8

[56] References Cited

U.S. PATENT DOCUMENTS

| | | |
|---|---|---|
| 1,121,189 | 12/1914 | Lincoln . |
| 2,099,521 | 7/1936 | Herkimer et al. ............... 273/72 R |
| 2,894,919 | 7/1959 | Simon et al. ................. 273/DIG. 8 |
| 3,801,098 | 4/1974 | Gildemeister . |
| 3,921,978 | 11/1975 | Warren ........................ 273/67 R |
| 4,032,143 | 6/1977 | Mueller et al. |
| 4,079,936 | 3/1978 | Schachter ...................... 273/67 R |
| 4,261,565 | 4/1981 | Massino, Sr. . |
| 4,343,467 | 8/1982 | Newcomb et al. . |
| 4,351,786 | 9/1982 | Mueller . |
| 4,569,521 | 2/1986 | Mueller ........................... 273/72 A |

Primary Examiner—Richard C. Pinkham
Assistant Examiner—Gary Jackson
Attorney, Agent, or Firm—Leydig, Voit & Mayer

[57] ABSTRACT

Cushioned baseball bats comprising a semi-rigid support structure and a resilient cushion portion surrounding at least a portion of the support structure are provided. The bats of this invention are of substantial enough weight and rigidity that they can be used in a game substantially similar to conventional baseball or softball, but the bats of this invention are less likely than conventional baseball bats (or bats designed to replace conventional bats) to cause serious injury when they strike a person. The bats of this invention are preferably used with lighter and softer balls so that a game that is substantially similar to conventional baseball or softball may be played with a reduced danger of serious injury.

15 Claims, 3 Drawing Figures

CUSHIONED BAT

TECHNICAL FIELD

This invention relates to bats and, more particularly, to cushioned bats which can be used in a game that is substantially similar to conventional baseball. The bats of this invention are less likely to inflict accidental serious injury than conventional bats and bats designed to replace conventional bats. This invention also relates to the method of producing cushioned bats.

BACKGROUND ART

The bats of this invention can be used in a game that is substantially similar to conventional baseball. However, the participants in the game contemplated by the present invention are less likely to be seriously injured and property is less likely to be damaged when struck by the bat. The bat is preferably used in conjunction with softer and lighter balls, such as those disclosed in U. S. Pat. No. 4,261,565.

Baseball bats having a relatively hard form, typically made of solid wood or hollow metal, have been used for years. A need for a potentially less dangerous bat has long been recognized by the sporting industry. Attempts have been made to satisfy this need by, for example, forming bats of hollow blow-molded plastic. While these lightweight bats have been used, they generally do not perform in a manner that is substantially similar to conventional bats, for example, they are generally not useful for hitting balls which have aerodynamic properties similar to those of conventional baseballs.

Softer, less dangerous bats that perform in a manner substantially similar to conventional baseball bats would benefit the sporting public for the following reasons:

1. handicapped children and children at younger ages could enjoy a game substantially similar to baseball;
2. the game could be played with a reduced danger of injury to the participants;
3. the technical skills used to play baseball could be developed by young people;
4. the skills could be learned and applied in confined spaces such as smaller playing fields, yards, and gymnasiums; and
5. property with which the bat comes into contact, e.g., gymnasium floors and bleachers, would be less likely to be damaged by such contact.

Conventional bats, as referred to herein, are generally those which are typically used in the games of baseball (hardball) and softball, e.g., bats made of wood or aluminum. The bats of this invention would be of particular benefit to young children who have not yet developed the strength required to firmly hold a bat during a swing, who often have a greater tendency to be in a position near someone swinging a bat, and who are generally more susceptible to serious injury when struck by a bat.

The bats in accordance with this invention are preferably used with lighter and softer balls in a game in which the participants are less likely to be seriously injured than in a conventional baseball or softball game and the bats perform substantially similarly to conventional bats although they are not intended to replace conventional bats.

DISCLOSURE OF INVENTION

According to the invention, bats which are less likely to inflict serious injury than conventional bats (and bats designed to replace conventional bats) are provided. The bats of the present invention have a significantly lower surface hardness and a greater compressibility, as defined below, than conventional bats and bats designed to replace conventional bats. The bats in accordance with the present invention weigh from about 8 to about 40 ounces and have the general swing aerodynamics, appearance, size, and shape of conventional bats and they perform substantially more similarly to conventional bats than hollow, thin-walled, blow-molded plastic bats do. The bats of this invention can, therefore, be used with lighter and softer balls to allow people, especially young children and handicapped people, to play a game which: (1) is substantially similar to conventional baseball, (2) develops in its participants the skills that are required to play baseball well, and (3) can be played in a greater variety of areas due to the reduced likelihood of damage to property. The participants in the game contemplated by the present invention are less likely to be seriously injured when struck by a bat in accordance with this invention than when struck by a conventional bat.

The bats in accordance with this invention comprise a semi-rigid support structure extending along the longitudinal axis of the finished bat. The support structure may be made of wood, aluminum or any other suitable material. The support structure is covered at least in part, preferably completely, by a deformable, resilient cushion portion which preferably has an integral skinned surface formed on its outer surface. The shape and the amount of the cushion portion material on different sections of the bat are chosen to impart desired properties on the bat. A knob structure may be provided at the lower end to help prevent the bat from escaping the batter's grasp. Also, the handle of the bat may have tape wound thereon to provide additional means to aid a batter in firmly gripping the bat.

BEST MODE FOR CARRYING OUT THE INVENTION

The following detailed description of the bat and its method of manufacture refers in part to the Figures briefly described above and is generally applicable to cushioned bats in accordance with the present invention.

Figure 1:
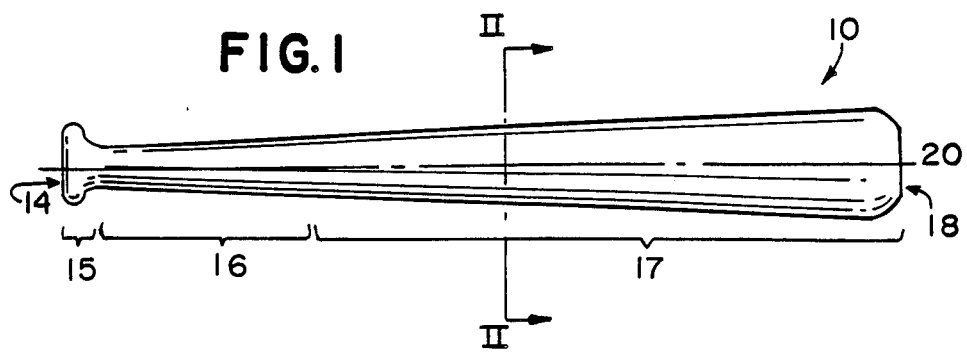
FIG. 1 is a side view of the finished bat of this invention.
Figure 2:
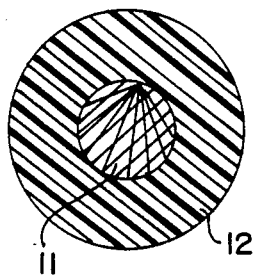
FIG. 2 is a cross-sectional view taken along the line II—II of FIG. 1 showing the interior of one form of a finished bat in accordance with the present invention.

Referring to the drawings, the bat 10 comprises two distinct regions, namely, a semi-rigid support structure 11 and a deformable, resilient cushion portion 12, as shown in FIG. 2. For purposes of explanation, the bat is described as having three sections, namely, the base 15, the handle 16 and the barrel 17, as shown in FIG. 1.

Figure 3:
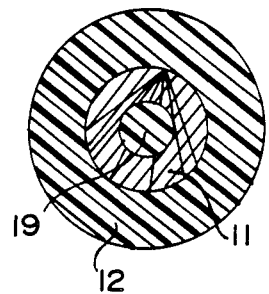
FIG. 3 is a cross-sectional view taken along the line II—II of FIG. 1 showing the interior of a second form of a finished bat in accordance with the present invention.

The semi-rigid support structure 11 may be constructed of wood, aluminum, steel, fiberglass, rubber, plastic, such as polyvinyl chloride, or any other suitable material. For example, a wooden dowel or a resin impregnated glass fiber structure may be used. Alternatively, as shown in FIG. 3, the support structure may be formed by filling a hollow support structure, e.g., a plastic tube, with a support core 19, preferably formed of foamed material similar to that used to form the cushion portion 12. Additionally, the support structure 11 may be surrounded by a layer of woven glass cloth or the like.

The semi-rigid support structure 11 is preferably solid and preferably measures from about 24 to about 34 inches in length and from about 0.5 to about 1.0 inch in diameter, most preferably about 0.75 inch in diameter. By "semi-rigid" is meant a support structure which, when tested according to ASTM D790 (modified) as described below, requires a force within the range of from about 75 to about 230 pounds to produce a deflection of 0.5 inch. ASTM D790 (modified), as used herein, is conducted by placing the support structure to be used in forming a bat upon a pair of flat wooden supports positioned perpendicularly with respect to the support structure and such that the support structure rests horizontally upon the two supports. The supports are approxiately 20 inches apart and each have a width of about 1.75 inches. The support structure is placed such that its center of gravity is approximately equidistant from the two supports. Force is then applied to the support structure from above approximately adjacent the center of gravity of the support structure. Deflection is measured in the direction of the force applied. The semi-rigid support structure, when tested according to ASTM D790 (modified) as described above, preferably requires a force of from about 85 to about 200 pounds to produce a deflection of 0.5 inch.

The support structure preferably extends through the base 15, the handle 16 and the barrel 17. The support structure 11 may be of a length approximately equal to that of the desired finished bat, but it is preferred that the support structure 11 be covered by at least one-half inch of resilient cushion portion 12 at both ends of the bat. It may be necessary, however, that the support structure 11 extend to the lower end 14 of the bat to provide adequate support for the handle 16 and the base 15. The support structure 11 and the finished bat 10 are preferably coaxial, i.e., the axis of the support structure 11 lies on the longitudinal axis 20 of the bat. The support structure 11 may be cylindrical, frustoconical, conical, triangular in cross-section, iron cross-shaped in cross-section, or any other regular or irregular shape, provided that the finished bat 10 has the desired weight distribution and rigidity. For example, it may be desirable to construct the support structure so that its circumference is uniform through most of the barrel 17, tapers in the portion of the barrel nearest the handle 16 and is again uniform (but smaller) in the handle 16.

The support structure is preferably completely covered by a deformable, resilient cushion portion 12, preferably of a foam material having a density from about 10 to about 50, preferably from about 10 to about 30, pound mass per cubic foot. A polyurethane foam is preferably used to form the resilient cushion portion but other materials, such as foamed acrylonitrile butadiene styrene (ABS), cellular polyethylene, polypropylene and homologues, expanded polystyrene, foamed polyesters or cellular polyvinyl chloride, may also be used. The cushion portion is preferably symmetrical with respect to the longitudinal axis 20 of the finished bat. The thickness of the cushion portion may vary along the length of the bat to impart desired weight and softness characteristics along the bat. It may be desirable for the cushion portion 12 to cover the support structure 11 only along the length of the barrel 17. However, the cushion portion 12 preferably covers the entire support structure 11. The cushion portion 12 may further comprise fillers, such as glass fibers, to provide reinforcement. The fillers may be selectively incorporated to provide the bat with suitable weight distribution.

It is desirable that the cushion portion 12 tightly adhere to the support structure 11, particularly when the support structure has a relatively smooth surface, for example, an aluminum support structure, to dampen the vibration which occurs when the bat comes in contact with a ball. Adhesion between the two regions can be enhanced, for example, by etching or forming grooves in the support structure prior to molding the cushion portion, or by wrapping the support structure with tape, e.g., gauze tape, before molding the cushion portion.

An integral skin is preferably formed on the outer surface of the cushion portion 12 to provide the bat with a desirable striking and gripping surface. The outer surface of the cushion portion 12 preferably provides a smooth exterior surface of a shape substantially similar to that of a conventional baseball bat which can be easily gripped on the handle 16 and which provides a surface with which the batter can strike the ball effectively.

The lower end 14 and the upper end 18 preferably comprise part of the cushion portion 12 so as to cushion the respective ends of the bat. A knob structure may be provided at the base 15 and may be formed as a part of the cushion portion 12. Alternatively, a solid disc formed of wood, plastic or any other suitable material may be provided to help support the knob structure. If a solid disc is included, it may be attached, for example, by screwing it into the support structure.

The exterior face of the cushion portion 12 in the handle 16 may be wrapped with tape or any other suitable material to further aid the batter in gripping the bat.

The cushioned bat of the present invention is preferably formed by the method described below.

A mold which defines a shape substantially similar to the shape of the desired finished bat is provided. The mold may comprise a single piece or any number of pieces capable of being held together to act as a mold. The mold preferably comprises two pieces which are adapted to be held together, for example, by bolts.

The support structure 11 is preferably constructed of wood although any semi-rigid material, for example, fiberglass, rubber, plastic, aluminum, or the like, may be used. The support structure 11 is centrally placed in the mold. The support structure 11 is preferably held in place by means of retractable pins, although other means may be used.

A foam-forming mixture, i.e., material that can be reacted and cured to form a foam, is introduced into the mold in any suitable manner, preferably by injecting it into the bottom of the mold. Polyurethane foams are preferred. However, cellular polythylene, polypropylene and homologues, expanded polystyrene, foamed polyesters, cellular polyvinyl chloride, or any other foam material capable of exhibiting adequate cushioning properties may be used.

A gap is preferably provided between the support structure 11 and the mold along the entire length of the support structure into which the material provided for forming the cushion portion 12 can enter. In this manner at least some thickness of cushioning will be provided along the entire length of the bat and a skinned surface will preferably enclose the entire bat.

The foam-forming mixture preferably comprises an isocyanate and one or more active hydrogen-bearing polymeric substances, and preferably also includes a catalyst and a blowing agent.

The isocyanate material may comprise tolylene diisocyanate, methylene diphenyl 4,4' diisocyanate, hexamethylene diisocyanate, or generally any poly-functional isocyanate or combination thereof.

The active hydrogen-bearing material may comprise a polyol, a compound with thiol end groups, a compound with carboxylic acid end groups, a compound with amino groups, or generally any compound having active hydrogen groups.

The blowing agent may comprise monofluorotrichloromethane or methylene chloride (both of which tend to result in a cushion portion having a higher density skinned surface), carbon dioxide (which will result in a skinned surface of a density substantially similar to the interior of the cushion portion), water or any other suitable material.

The catalyst may comprise tertiary amines and/or organic metal compounds, such as N-ethyl morpholine, N-coco morpholine, N,N'-dimethyl piperazine, triethylene diamine, stannous octoate, dibutyl tin mercaptide, or other suitable catalyst materials.

Other materials which may be included in the foam-forming mixture include:

(1) chain extenders, for example, diols, such as diethylene glycol, propylene glycol, 1,4 butane diol, 1,6 hexane diol, (2) cross-linkers, for example, triols, such as triethanol propane, (3) surfactants, for example, silicone polyether copolymers, (4) reinforcing fillers, for example, glass fibers, carbon fibers, organic fibers (such as Aramid KEVLAR TM), inorganic whiskers (such as calcium sulfate), silicates, titanium dioxide, and hollow microglass spheres, and (5) color pigments.

The foam-forming composition is preferably mixed just prior to entering the mold and is then cured in the mold to form the foamed cushion portion. The temperature within the mold may be varied during the reaction to accelerate or slow the rate of reaction.

In general, foam material which is in contact with the mold wall during the course of the reaction will form a skin. This is due, at least in part, to the fact that, during reaction, the mold walls are generally cooler than the reactants and the foam material formed by the reactants. The nature of the skin varies depending on the particular blowing agent used. When monofluorotrichloromethane or methylene chloride is used as the blowing agent, the foam material cells in the skin tend to collapse, forming a skinned surface of a greater density than the interior of the foam material. Conversely, when carbon dioxide is used as the blowing agent, the foam material cells in the skin do not tend to collapse and usually are of substantially the same size as those in the interior of the structure.

When the foam has completely cured, the finished bat is removed from the mold by, for example, dismantling the mold.

The finished bat preferably has a surface hardness, as determined by the ASTM 2240-68 method, of from about 25 to about 50, more preferably from about 30 to about 45. The ASTM test is, for the purposes of this invention, measured about 5 inches from the upper end 18.

The finished bat preferably has an HA Compressibility (as defined below) of less than 100 pounds, more preferably from about 5 to about 50 pounds, most preferably from about 10 to about 30 pounds. HA Compressibility, as used herein, is determined in accordance with the following test. An increasing load is applied to a 1 square inch surface of the barrel section of the bat, preferably about 2 inches from the upper end. When the depth of compression reaches 0.1 inch, the magnitude of the force being applied is recorded. This magnitude is referred to herein as the HA Compressibility.

Bats formed in accordance with this invention preferably weigh from about 8 to about 40 ounces, more preferably from about 8 to about 30 ounces, and preferably measure from about 25 to about 35 inches, more preferably from about 27 to about 32 inches, from the lower end 14 to the upper end 18. Two preferred bats are (a) one weighing from about 10 to about 15 ounces, preferably about 12 ounces, measuring from about 25 to about 29 inches, preferably about 27 inches, in length, having a cushion portion formed of a polyurethane foam and having a wooden support structure which, when tested according to ASTM D790 (modified) as described above, requires a force of from about 75 to about 125 pounds to produce a deflection of 0.5 inch, and (b) one weighing from about 23 to about 27 ounces, preferably about 25 ounces, measuring from about 30 to about 34 inches, preferably about 32 inches, in length, having a cushion portion formed of a polyurethane foam and having a support structure formed of wood which, when tested according to ASTM D790 (modified) as described above, requires a force of from about 75 to about 125 pounds to produce a deflection of 0.5 inch. Because of its strength and elastic properties, the wood of choice for the support structure of the above-described preferred bats is hickory. When aluminum is used as the support structure for the above-described bats, a higher range of values will result from the tests according to ASTM D790 (modified). This range will be from about 150 to about 230 pounds to produce a deflection of 0.5 inch. An elastic structure subjected to a shock will deflect until the product of the average resistance developed by the deflection and the distance through which it has been overcome, has reached a value equal to the energy of the shock. It follows that, for a given shock, the average resisting stresses are inversely proportional to the deflection. The effect of a shock is, therefore, to a great extent dependent upon the elastic property of the structure subjected to the impact. Since the aluminium is less elastic than the wood, it must be stronger to resist any permanent deformation resulting from the shock generated at impact.

The present invention is predicated on the discovery that, by proper selection of materials and the proper manufacturing technique, bats can be made which have surface hardnesses, as determined by the ASTM 2240-68 method, of from about 25 to about 50 and HA Compressibilities of less than 100 pounds. The bats in accordance with the present invention are of such shapes, sizes and weights that they can readily be used in a game which is substantially similar to conventional baseball. However, due to the favorable hardnesses and compressibilities of the bats in accordance with the present invention, the participants in such a game are less likely to be seriously injured when accidentally struck by the bat than in a conventional baseball game.

We claim:

1. A cushioned bat having a lower end, a handle, a barrel, and an upper end, said cushioned bat comprising a semi-rigid support structure extending along the longitudinal axis of said bat and having a length substantially equal to the cushioned bat and a deformable, resilient cushion portion surrounding at least a portion of said support structure, said resilient cushion portion being formed of a polyurethane foam having a density from about 10 to about 30 pound mass per cubic foot, said cushioned bat having a length of 25 to 35 inches, a weight of 8 to 30 ounces, a surface hardness, as determined by the ASTM 2240-68 method, of from about 25 to about 50, an HA Compressibility of 5 to 50 pounds, and said support structure when tested according to ASTM D790 (modified) requiring a force of from about 75 to about 230 pounds to produce a deflection of 0.5 inch, said cushioned bat having the general shape of a conventional baseball or softball bat but being less likely to inflict serious injury when it comes in contact with a person.

2. The bat of claim 1 wherein said bat measures from about 25 to about 29 inches in length and weighs from about 10 to about 15 ounces, and said support structure (a) is comprised of wood, and (b) when tested according to ASTM D790 (modified) requires a force of from about 75 to about 125 pounds to produce a deflection of 0.5 inch.

3. The bat of claim 1 wherein said bat measures from about 30 to about 34 inches in length and weighs from about 23 to about 27 ounces, and said support structure (a) is comprised of wood, and (b) when tested according to ASTM D790 (modified) requires a force of from about 75 to about 125 pounds to produce a deflection of 0.5 inch.

4. The bat of claim 1 wherein a skin is formed on the surface of said cushion portion.

5. The bat of claim 1 wherein said cushion portion forms a knob structure adjacent said lower end.

6. The bat of claim 5 wherein said knob structure is integral with said cushion portion.

7. The bat of claim 1 wherein said cushion portion substantially completely covers said support structure with a varying thickness.

8. The bat of claim 1 wherein said support structure comprises a substantially cylindrical shape.

9. The bat of claim 1 wherein said support structure has a variable circumference along its longitudinal axis.

10. The bat of claim 1 wherein cloth tape is wrapped about the outer surface of the handle of said bat.

11. The bat of claim 1 wherein said cushioned bat has a surface hardness, as determined by the ASTM 2240-68 method, of from about 30 to about 45.

12. The bat of claim 1 wherein said cushioned bat has an HA Compressibility of from about 5 to about 35 pounds.

13. The bat of claim 1 wherein said support structure comprises a tube filled with foamed material.

14. The bat of claim 1 wherein said support structure, when tested according to ASTM D790 (modified), requires a force of from about 75 to about 230 pounds to produce a deflection of 0.5 inch.

15. A cushioned bat having a lower end, a handle, a barrel, and an upper end, said cushioned bat comprising a semi-rigid support structure extending substantially the entire length of said bat along the longitudinal axis of said bat and a deformable, resilient cushion portion surrounding at least a portion of said support structure, said cushioned bat having a length of 25 to 29 inches, a weight of from about 10 to about 15 ounces, said support structure being (1) comprised of wood, and (2) when tested according to ASTM D790 (modified) requiring a force of from about 75 to about 125 pounds to produce a deflection of 0.5 inch, a surface hardness, as determined by the ASTM 2240-68 method, of from about 30 to about 45 and an HA Compressibility of from about 10 to about 30 pounds, said cushion portion comprising a polyurethane foam having a density of from about 10 to about 30 pound mass per cubic foot and forming an integral knob structure adjacent said lower end, said cushion portion completely enclosing said support structure, said cushion portion provided with a skin on the outside surface thereof, said cushioned bat having the general shape of a conventional baseball or softball bat but being less likely to inflict serious injury when it comes in contact with a person.

* * * * *